INVENTOR
HERMAN EPSTEIN
BY
Laurence R. Brown
ATTORNEY

United States Patent Office 2,947,082
Patented Aug. 2, 1960

2,947,082
CRYSTAL DRIVEN DENTAL TOOL

Herman Epstein, Philadelphia, Pa.
(27 Latham Park, Melrose Park, Pa.)

Filed May 15, 1953, Ser. No. 355,305

8 Claims. (Cl. 32—46)

This invention relates to dental tools and drilling methods and more particularly it relates to electrically driven tools for drilling teeth.

Fear of rotating dentists' drills on the part of dental patients is in many cases well founded. The pressure necessary to drill through dental enamel together with the vibration sensation is uncomfortable. In addition to these sensations the rotary type drill generates considerable heat which is transmitted by the tooth to nerve centers and therefore may cause considerable pain. It is also difficult to reach many regions of the mouth with rotary drills without using clamps or causing further discomfort of the patient.

In addition to discomfort of the patient, it is often difficult for the dentist to operate rotary drills with the precision desired. This results in some cases because of unbalanced torque which may cause irregularly shaped holes to be drilled, or cause the drill to stray from the exact desired drilling position. With a rotary drill it is impossible to see the results of the drilling without removing the drill from the excavation. It is also difficult to gauge the depth or shape of cut without specific observation. Other drilling or excavating techniques such as sand blasting tend to mar a greater than desired area, and may deface mirror surfaces. Precise shaping of excavations is difficult and undercutting is virtually impossible. In addition, excess sand must be removed and may be objectional or unpleasant.

It is therefore an object of this invention to provide improved dental drilling tools substantially improving the above-mentioned defects of prior art tools.

It is a more specific object of the invention to provide dental drills which are comfortable in operation because of removal of both vibration and pressure sensations as well as heat.

A further objective of the invention is to provide a drilling tool capable of precision excavation and maximum visibility during actual drilling.

Another object is to provide dental drilling tools affording ready comfortable access to regions hitherto difficult to reach.

Further objects and advantages of the invention will be found throughout the following detailed description of the invention and its organization.

In accordance with the present invention there is provided a reciprocating driving bit having a hardened chipping or lapping bit member. The driving tool hereinafter designated a "drill" is actuated by an electrical oscillator at supersonic speeds so that the sensation generally accompanying the rotary type drills is not present. Excavations may be made with the present device by means of chipping or lapping the teeth rather than by prior art methods.

Details of the invention are described hereinafter in connection with the accompanying drawing, in which.

Figure 1:
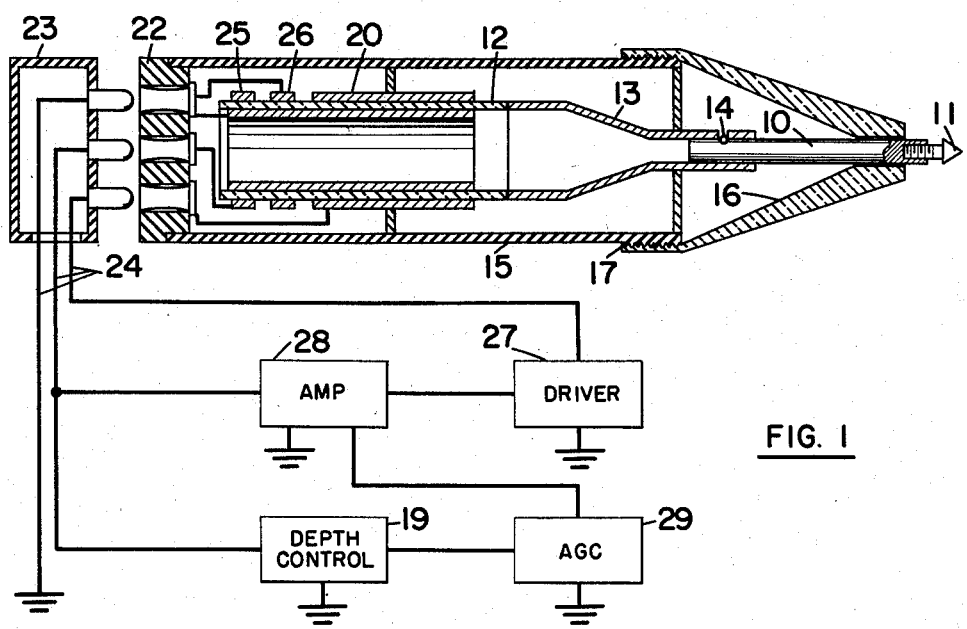
Fig. 1 is a diagrammatic view of a supersonic dental drilling system.

As shown in Fig. 1 a bit 10 having a hardened chipping point 11 is driven in reciprocatory motion by a piezoelectric crystal transducer 12 comprising a cylinder shaped body of barium titanate or similar material. A tapered coupling horn 13 is cemented to the crystal 12 and engages the bit 10 at a snap fitting 14. A suitable casing 15 is provided for rigid connection to the coupling horn and crystal at nodal points. This prevents vibration of the casing and permits full power to be utilized in driving the bit.

Figure 5:
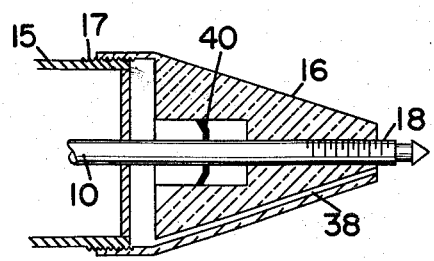
Fig. 5 is a sectional view of a guard assembly constructed in accordance with the invention.

A transparent bit guard 16 is provided with adjustable screw threads 17 for permitting a desired amount of drill extension to be varied at will as shown more clearly from the view of Fig. 5. The drill may be calibrated as at 18 if desired to afford a rough indication of the amount of mean protrusion about which the vibration occurs. Control of the amount of vibration is afforded electronically by means of the depth control circuit 19, which permits the length of stroke to be adjusted. As the bit excavates to the desired depth the transparent guard 16 prevents further ingress. Because of the speed of operation the bit looks as if it is standing still, and in general it is easy to view the state of work at any time through the transparent guard member. The index of refraction of this member is preferably near that of air so that lens action will not afford a distorted view. However, a specially shaped member could be utilized if desired for the purpose of a viewing lens.

The crystal 12 is driven by an electronic driver circuit 27 of the type described in the Journal of the Acoustical Society of America, vol. 23, March 1951, pp. 209–14, in an article by Mason and Wick entitled "Barium Titanate Tranducers Capable of Large Motion at Uutrasonic Frequencies." Driving electrode 20 is plated or fired onto the crystal 12 and coupled to an electrical connector plug in the base member 22. A mating plug member 23 and cable 24 serve to connect the electronic circuit to the crystal transducer. To stabilize operation for a more accurate control of the depth of excavation a feedback arrangement is utilized. The additional electrode 25 serves to generate the feedback potential and is isolated from the driving electrode 20 by the neutral shielding electrode 26.

Oscillation of the driver 27 is effected by way of regenerative feedback through amplifier circuit 28. An auxiliary shunting circuit comprising the depth control circuit 19 and automatic gain control circuit 29 provides a degenerative feedback with a selectively variable threshhold level so that stabilized operation is afforded as well as control over the magnitude of stroke.

It is readily recognized that with the presently described drill, the dentist does not have to fight the driving torque present in rotary type drills. The excavating may be done either by means of chipping or lapping actions. During the chipping process the bit is not kept in constant heat conduction contact with the tooth to provide heat transmission. Since the operational speed is supersonic, no unpleasant sensation of drilling or pressure occurs to the patient. Fine control of the depth of cut may be afforded by means of the optional guard 16, and visual control of all excavation work is afforded by properly shaped bits.

Figure 2:
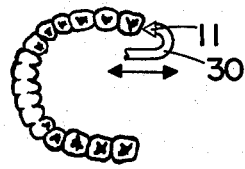
Figs. 2 to 4 are views of different bits to be used in accordance with the teachings of the invention.
Figure 3:
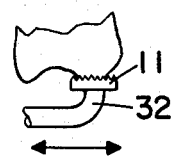

In order to reach inaccessible places a J-shaped drill body or shaft 30 as shown in Fig. 2 may be used. The chipping edge or tip 11 is mounted for motion generally parallel to the direction of vibration and is pointed towards the vibrator. It is readily seen that such a bit affords extreme advantage in drilling techniques. Precise control of the shape, angle and depth of excavation can be made in any region of the mouth by means of the vibratory chipping action with the J-shaped bit 30.

For lapping action an L-shaped bit body 32 with the chipping or cutting edge 11' on the tip of an arm extending perpendicular to the direction of motion is provided. By combining the chipping and lapping actions, any desired form of dental excavation may be readily accomplished.

Figure 4:
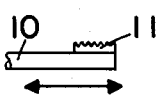

As shown in Fig. 4 lapping may be provided with a straight bit, if desired, with the cutting edge 11' mounted on the side.

Reciprocatory motion of the bit 10 causes a pumping action which generally causes air to puff out a suitable small conveying channel 38, such as that of Fig. 5. This serves to clean chips and residue out of the excavation if desired. The air pressure may be increased by adding suitable diaphragms 40, if necessary.

The improvements in drills and dental techniques are clearly recognized from the preceding description. Those features, therefore, which are believed descriptive of the nature of the invention are described with particularity, and for which Letters Patent are desired, on the following claims.

I claim:

1. A dental drilling system comprising, a supersonic vibrator, electronic means for driving said vibrator, a drilling bit having a shank and a chipping point coupled to said vibrator, a transparent shield member housing the shank of said bit so that the chipping point protrudes, and means for adjustably positioning the shield member along the shank relative to the chipping point whereby the depth of drilling may be accurately gauged.

2. A dental tool comprising a vibrator, a drill driven in reciprocatory motion by the vibrator, air pumping structure driven by the reciprocatory motion to afford air puffs, and drill housing means conveying the air puffs to the vicinity of the cutting edge.

3. A dental tool system comprising in combination, a piezo-electric cylindrical transducer, a tapered coupling horn attached to said cylinder, a drill coupled to the horn for reciprocatory motion by said transducer, a housing secured to said transducer and horn at nodal points, a transparent guard extending along the drill shaft, diaphragm means coupled for movement with said drill for generating puffs of air with the reciprocatory motion, a channel in said guard for conveying air puffs to the chipping edge of the drill, and calibrated adjusting structure for selectively extending the drill a desired distance from the guard.

4. A system as defined in claim 3 wherein the drill is L shaped with the cutting edge mounted on one arm extending substantially perpendicular to the direction of motion of the drill, and having the cutting edge positioned for lapping a surface extending in a direction parallel with the reciprocatory motion as the drill reciprocates.

5. A system as defined in claim 3 wherein the drill is J-shaped with the chipping edge mounted on one extremity extending substantially parallel to the direction of motion of the drill and facing the transducer to permit drilling in a direction toward the transducer.

6. The combination of a vibratory dental tool and a J-shaped drill with a chipping edge coupled for parallel motion along the axis of the tool, said chipping edge being directed substantially in the direction of the vibratory tool and facing the dental tool to permit drilling in a direction toward the dental tool.

7. The combination of a vibratory dental tool and an L-shaped lapping drill with a multi-tooth chipping edge at the end of the arm and extending perpendicular to the axis of the tool and means coupling the drill to the dental tool to vibrate along the axis to permit lapping of a surface extending in a direction parallel to the vibration.

8. The combination defined in claim 3 including an adjustable transparent guard along the bit for gauging the depth of drilling.

References Cited in the file of this patent

UNITED STATES PATENTS

| | | |
|---|---|---|
| Re. 17,245 | Cady | Mar. 26, 1929 |
| 1,316,685 | Cates | Sept. 23, 1919 |
| 1,966,446 | Hayes | July 17, 1934 |
| 2,044,807 | Noyes | June 23, 1936 |
| 2,283,285 | Pohlman | May 19, 1942 |
| 2,444,349 | Harrison | June 29, 1948 |
| 2,552,134 | Berliner | May 8, 1951 |
| 2,588,006 | Hufnagel | Mar. 4, 1952 |
| 2,651,148 | Carwile | Sept. 8, 1953 |

OTHER REFERENCES

Electronic Engineering, for August 1944, pp. 122–3. (Copy in Science Library.)